(12) United States Patent
Kito (10) Patent No.: US 7,321,724 B2
(45) Date of Patent: Jan. 22, 2008

(54) PHOTOGRAPHIC METHOD AND PHOTOGRAPHIC APPARATUS

(75) Inventor: Eiichi Kito, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 101 days.

(21) Appl. No.: 11/252,799

(22) Filed: Oct. 19, 2005

(65) Prior Publication Data
US 2006/0083500 A1 Apr. 20, 2006

(30) Foreign Application Priority Data
Oct. 20, 2004 (JP) .............................. 2004-305421

(51) Int. Cl.
G03B 17/50 (2006.01)
G03B 21/00 (2006.01)
(52) U.S. Cl. ............................ 396/30; 396/2; 396/322; 355/40; 355/41; 382/171
(58) Field of Classification Search .................. 396/30, 396/322, 332
See application file for complete search history.

(56) References Cited

U.S. PATENT DOCUMENTS 4,533,224 A * 8/1985 Ou .............................. 396/322
4,896,208 A * 1/1990 Moriya et al. ............... 358/540
6,148,148 A 11/2000 Wain et al.
6,507,361 B1 * 1/2003 Barber ............................ 396/2
2006/0078224 A1 * 4/2006 Hirosawa ..................... 382/284
2006/0104631 A1 * 5/2006 Ho et al. ...................... 396/322

FOREIGN PATENT DOCUMENTS

JP 5-161064 A 6/1993
JP 2003-179811 A 6/2003

* cited by examiner

Primary Examiner—D. Rutledge
(74) Attorney, Agent, or Firm—Sughrue Mion, PLLC (57) ABSTRACT

The photographic method and apparatus take, at the same shooting position, a background image without a subject, a first principal image for outputting, and a second principal image whose shooting conditions differ from those of the first principal image with a camera for photoelectrically picking up an image, a changing device for changing shooting conditions and a shooting controlling device, and extract the subject based on a first difference between the background image and the first principal image and a second difference between the first principal image and the second principal image with an image processing device.

17 Claims, 5 Drawing Sheets

FIG. 5C  SECOND MAIN IMAGE

FIG. 5B  FIRST MAIN IMAGE

FIG. 5A  BACKGROUND IMAGE

PHOTOGRAPHIC METHOD AND PHOTOGRAPHIC APPARATUS

The entire contents of literatures cited in this specification are incorporated herein by reference.

BACKGROUND OF THE INVENTION

The present invention relates to a photographic apparatus installed at a storefront, a tourist site, and the like for users to take their ID photos or commemorative photos. More specifically, the present invention relates to a photographic method which is capable of taking ID photos and commemorative photos against appropriate backgrounds without needing drapery, a panel, or the like as a backdrop, and a photographic apparatus for implementing the photographic method.

ID photo-taking apparatuses installed at storefronts of photo labs, street corners, and the like usually have a box (booth) shape so that a person to be photographed (subject) enters the box and takes a picture of himself/herself against a given background under appropriate shooting conditions.

It is also common for commemorative photo-taking apparatuses installed at tourist sites, amusement parks, and the like to have drapery, a panel, or the like placed behind the subject in order to provide an even background.

While most of such commemorative or ID photo-taking apparatuses do not give users background options, photographic apparatuses disclosed in JP 05-161064 A and U.S. Pat. No. 6,148,148 are capable of compositing an image of a subject with an arbitrarily chosen background by utilizing chroma key technology which is used mainly for motion pictures, to extract (separate) the subject from the photographed image. However, this type of apparatus also needs a given backdrop (usually blue screen) in order to properly extract the subject by chroma key technology.

In short, conventional commemorative or ID photo-taking apparatuses need a box large enough for a person to enter inside, or drapery or a panel as a backdrop, which makes the apparatuses large in size and accordingly raises such problems as limited installation locations and high cost.

JP 2003-179811 A discloses an animation image compositing apparatus capable of compositing animation images without drapery or a panel as a backdrop. This apparatus detects changes in an animation footage taken, recognizes pixels whose coordinates have changed as motion pixels, extracts a principal image based on the result of recognizing motion pixels, discards other images than the principal image as background images, and composites the principal image cut out of the background with a created background image that is specifically chosen for this principal image.

The apparatus disclosed in JP 2003-179811 A utilizes changes in an image to extract the subject.

Therefore, the possibility is strong that an object in the background is included in the extracted subject when there is a change in the background such as a change in position of a background object (e.g., a parked car pulling out) and an appearance of a new background object (e.g., a passerby). In short, the apparatus of JP 2003-179811 A is low in accuracy of extracting the subject. Moreover, this method is not applicable to still images such as ID photos and commemorative photos taken according to JP 05-161064 A and U.S. Pat. No. 6,148,148, since those images exhibit no change that can be used to extract the subject.

SUMMARY OF THE INVENTION

The present invention has been made to solve the above-described problems of prior art, and it is therefore an object of the present invention to provide a photographic method that eliminates a box inside which a person to be photographed enters and drapery or a panel as a backdrop in taking ID photos, commemorative photos, and other still images, and that can extract and separate the subject from the background with high accuracy, regardless of changes in the background, to composite the extracted subject image with a desired background image, and to provide a photographic apparatus that embodies this photographic method.

In order to attain the above object, the present invention provides a photographic method, comprising: taking, at the same shooting position, a background image without a subject, a first principal image for outputting, and a second principal image whose shooting conditions differ from those of the first principal image; and extracting the subject based on a first difference between the background image and the first principal image and a second difference between the first principal image and the second principal image.

According to the photographic method of the present invention, the extracted subject is preferably composited with an image that is previously prepared for composition.

It is preferable that the extracting step of the subject comprises: extracting a first subject candidate based on the first difference between the background image and the first principal image; extracting a second subject candidate based on the second difference between the first principal image and the second principal image; and setting, as the subject, an area common to the first subject candidate and the second subject candidate.

The first principal image and the second principal image are preferably photographed at different illumination settings.

Alternatively, the first principal image and the second principal image are preferably photographed at different apertures.

In order to attain the above object, the present invention provides a photographic apparatus, comprising: a camera for photoelectrically picking up an image; changing means for changing shooting conditions; shooting controlling means for causing the camera and the changing means to carry out shooting of a background image without a subject, a first principal image for outputting, and a second principal image whose shooting conditions differ from those of the first principal image; and image processing means for extracting the subject based on a first difference between the background image and the first principal image and a second difference between the first principal image and the second principal image.

According to this photographic apparatus of the present invention, the image processing means preferably creates a composite image by compositing the extracted subject with an image that is previously prepared for composition.

It is preferable that the photographic apparatus further comprises a light source or sources for illuminating the subject, wherein the changing means sets the light source or sources to different illumination settings for shooting of the first principal image and shooting of the second principal image.

The light source or sources are preferably an LED.

Alternatively, it is preferable that the camera has an aperture and the changing means sets different apertures for shooting of the first principal image and shooting of the second principal image.

It is preferable that the photographic apparatus further comprises at least one of a printer which outputs, as a print, the composite image created by the image processing means, and recording means which records onto a recording medium the composite image-created by the image processing means.

Structured as above, the present invention can eliminate, from a commemorative or ID photo-taking apparatus, a box (booth) inside which a person to be photographed enters so that the subject is photographed under suitable shooting conditions with the box's wall as a background, and drapery or a panel as a backdrop of the photo. The present invention thus greatly reduces the apparatus in size, and greatly enhances the degree of freedom in choosing where to install the apparatus, thereby making it possible to install the apparatus in small stores or the like without difficulties.

In addition to eliminating drapery or the like as a backdrop, the present invention is capable of extracting a subject from an image with high accuracy and separating the subject from the background regardless of changes in the background (scene shot). Therefore, the extracted subject can be composited with an arbitrarily chosen background image to create an ID photo or a commemorative photo as desired.

DETAILED DESCRIPTION OF THE PREFERRED EMBODIMENT

A detailed description will be given below on a photographic method and photographic apparatus of the present invention through a preferred embodiment illustrated in the accompanying drawings.

Figure 1:
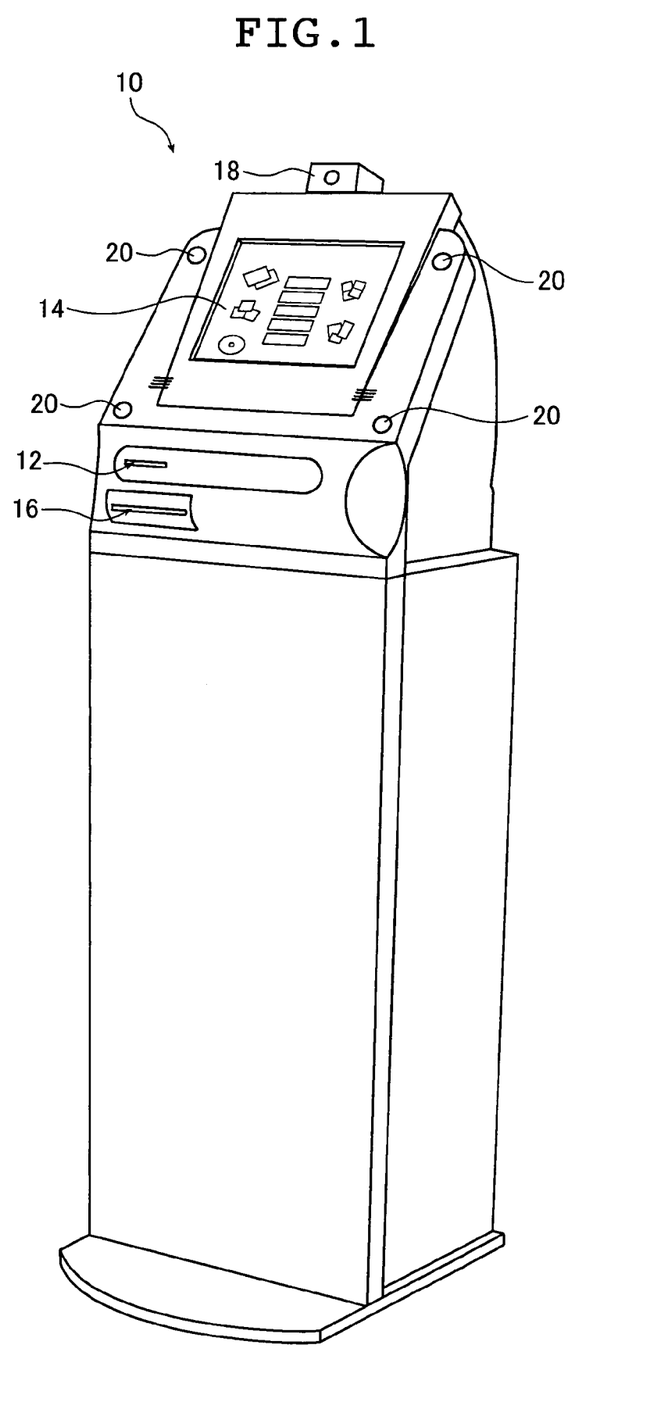
FIG. 1 is a schematic perspective view showing an example of a print order receiving machine which utilizes a photographic method and photographic apparatus of the present invention.
Figure 2:
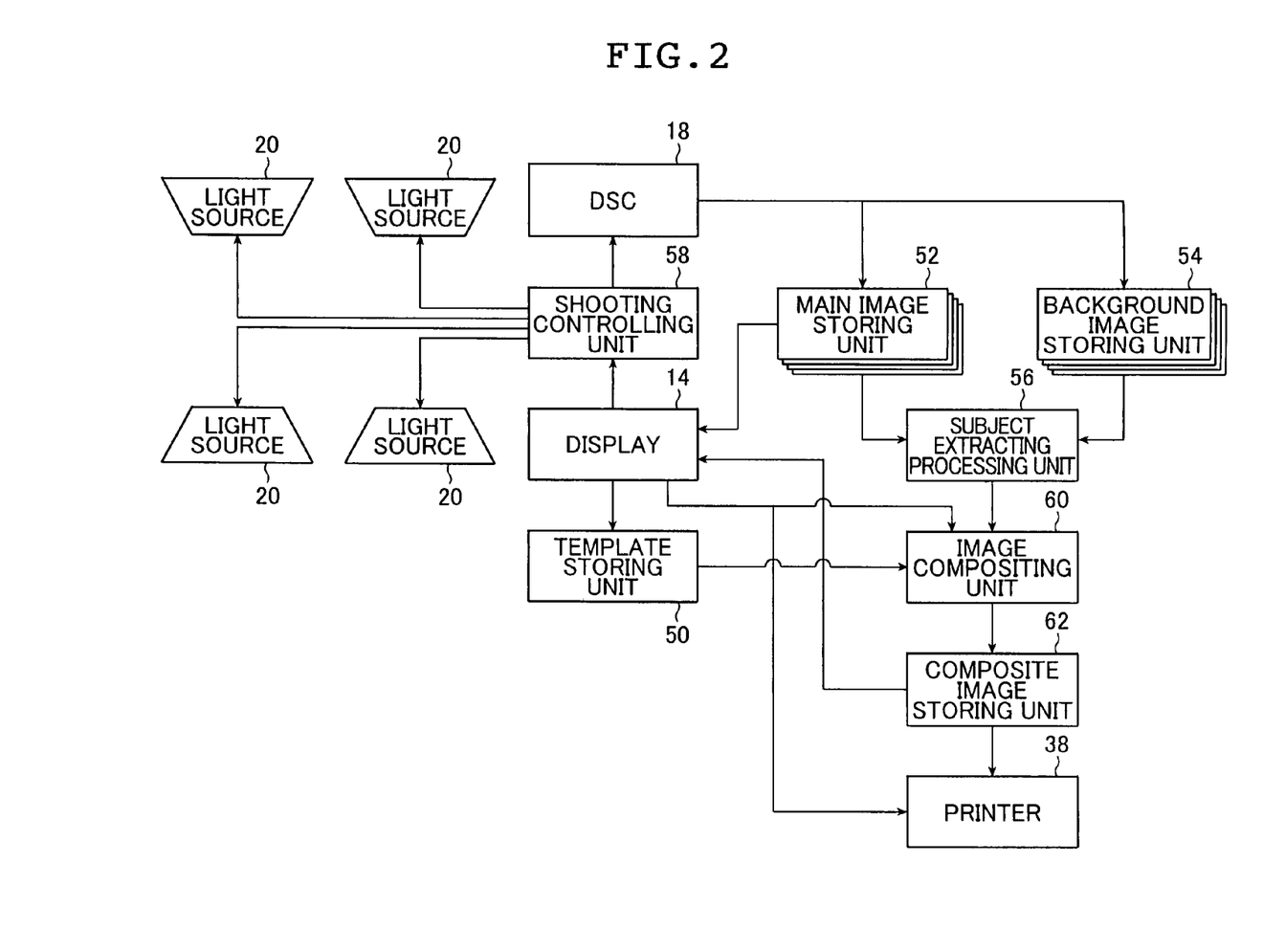
FIG. 2 is a schematic block diagram illustrating the configuration of a shooting/extracting processing system of the print order receiving machine shown in FIG. 1.
Figure 3:
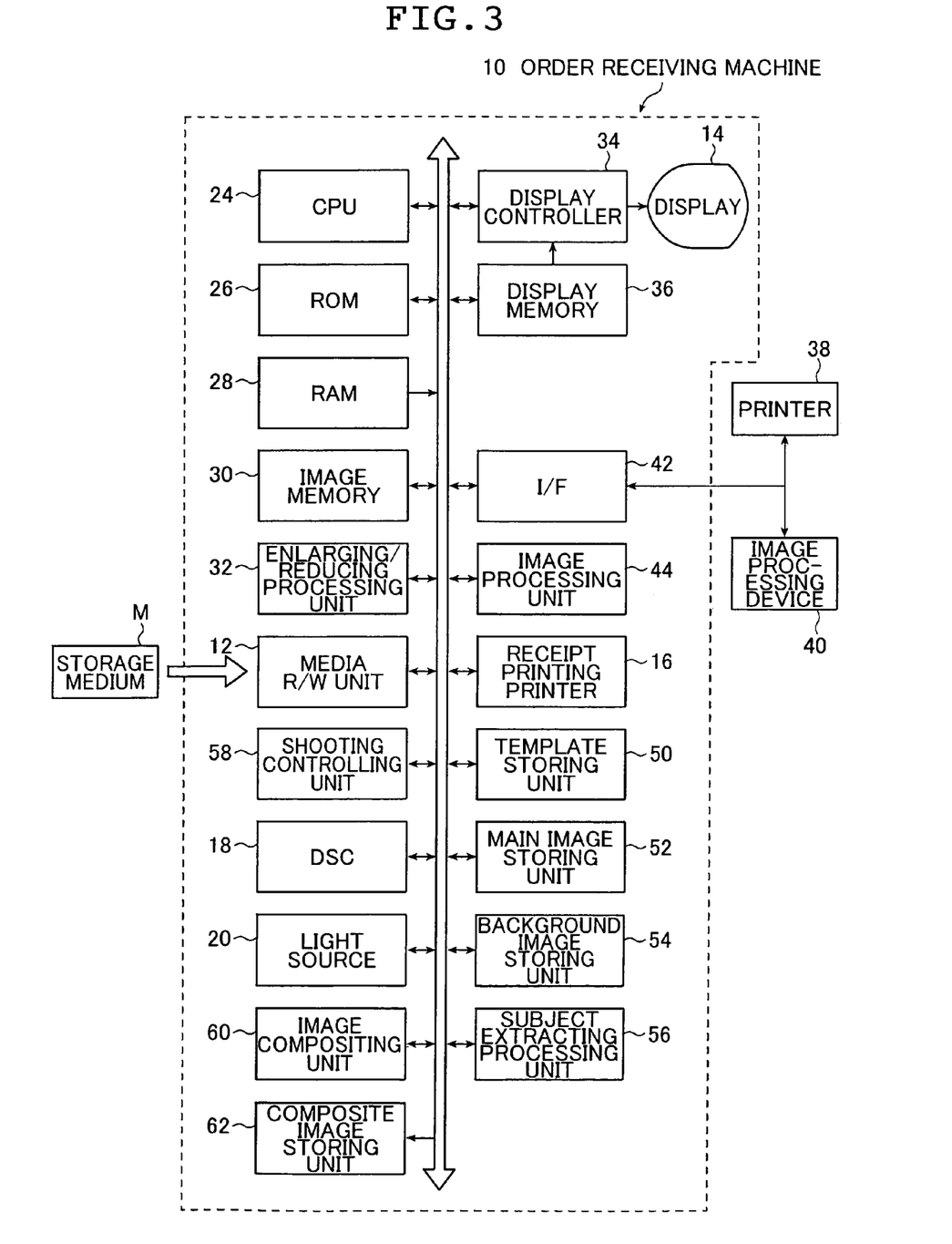
FIG. 3 is a system configuration diagram of the print order receiving machine shown in FIG. 1.

FIG. 1 shows a schematic perspective view of an example of a print order receiving machine which carries out a photographic method of the present invention by employing a photographic apparatus of the present invention. FIG. 2 shows a block diagram outlining the configuration of a shooting/extracting processing system of this print order receiving machine. FIG. 3 shows a system configuration diagram of this print order receiving machine.

The print order receiving machine shown in FIG. 1 denoted by 10 (hereinafter referred to as order receiving machine 10) is obtained by adding photographing functions for carrying out the present invention to a print order receiving machine which receives such an order as to produce a printed copy from an image (image data) picked up with a digital camera or the like and recorded in various recording media including SmartMedia™ and CompactFlash™. The order receiving machine 10 has a storage media loading unit (storage media read/write unit (hereinafter referred to as media R/W unit)) 12, a display 14 and a receipt outputting unit (receipt printing printer) 16, plus a digital camera (DSC) 18 for picking up an image and a light source 20 for illumination upon shooting.

In addition to these exterior parts, the order receiving machine 10 basically has such interior parts as a CPU 24, a ROM 26, a RAM 28, an image memory 30 for storing like a buffer an image (image data) that is read out of a recording medium M and an image that is to be recorded on the recording medium M, an enlarging/reducing processing unit 32 for enlarging/reducing an image, a display controller 34, a display memory 36 for storing an image that is to be displayed on the display 14, an interface (I/F) 42 for connecting the order receiving machine 10 with a printer 38 and with an external image processing device 40, an image processing unit 44 for performing necessary image processing including gray scale correction and color/density correction on an image read out of the recording medium M, a template storing unit 50, a principal image storing unit 52, a background image storing unit 54, a subject extracting processing unit 56, a shooting controlling unit 58, an image compositing unit 60, and a composite image storing unit 62.

The order receiving machine 10 employs known methods for all of various kinds of image processing in the image processing unit 44 and image enlargement/reduction (electronic magnification processing) in the enlarging/reducing processing unit 32.

The printer 38 in the embodiment shown in FIG. 3 is set apart from the order receiving machine 10 and is externally connected to the order receiving machine 10. However, the order receiving machine 10 of the present invention (photographic apparatus of the present invention) is not limited thereto and may have a built-in printer 38.

Any type of printer, whether it is an externally connected type or a built-in type, can be employed as the printer 38. To give an example, the printer 38 may be a digital photo printer in which a latent image is recorded by exposing a photosensitive material (developing paper) to a light beam that is modified in accordance with (image data of) a recorded image, and given wet treatment is performed on the exposed photosensitive material, or may be a printer that uses a thermally developable photosensitive material to transfer an image onto an image receiving medium through a heat developing process in the presence of an image forming solvent such as water, an electrophotographic printer, an inkjet printer, or a thermal printer which uses a thermal head.

The receipt printing printer 16 may also be a thermal printer or other known printers that are used in photo order receiving machines installed at storefronts and the like.

The media R/W unit 12 can be a reader/writer of any known storage medium, for example, SmartMedia™, CompactFlash™, Memory Stick™, SD Memory Card™, PC Card, CD-R, or MD.

The media R/W unit 12 may be designed to accommodate several types of storage medium instead of only one type.

The shooting controlling unit 58 is the unit that controls the operation of the DSC 18 and the light source 20.

The DSC 18 is basically a known digital (still) camera.

In the order receiving machine 10 shown in the drawings, the DSC 18 picks up a background image without a subject, a first principal image corresponding to the output, and a second principal image in response to an instruction from the shooting controlling unit 58 (shooting signal). The first principal image and the second principal image, both of which show the subject, are taken in succession but under different shooting conditions. In the illustrated embodiment, the first principal image is photographed with the light source 20 turned on (illumination on upon shooting) whereas the second principal image is photographed with the light source 20 turned off (illumination off upon shooting). A more detailed description will be given later.

The DSC 18 is fixed in position in the embodiment shown in FIG. 1 for better operability in shooting, but may be adjustable in angle so that it can be directed to the left or right and tilted upward or downward as the need arises.

The light source 20 is a light source that emits light in response to an instruction from the shooting controlling unit 58 to provide illumination for shooting. In the embodiment shown in FIG. 1, four light sources are arranged to surround the display 14.

The light source 20 is not limited to a particular type. Various kinds of light source are employable as long as they can illuminate the subject (person to be photographed) evenly in an amount of light enough for shooting. The light source 20 has to provide illumination in a manner that enables the order receiving machine 10 to properly photograph a subject who is positioned near the order receiving machine 10. At the same time, it is preferable that light emitted from the light source 20 focuses on the subject and does not reach the background since, in the order receiving machine 10 shown in the drawings, illumination settings for shooting are changed so that the first principal image and the second principal image have different shooting conditions. Also, in order to avoid wasting time in taking the second principal image after the first principal image is photographed, it is preferable to choose as the light source 20 one that is quick to respond.

Considering the above points, LED is preferred as the light source 20 because of its quick response and small size, which enables the order receiving machine 10 to have plural light sources adjusted in direction and arranged so that the subject is illuminated evenly from multiple directions.

The template storing unit 50 stores an (image) template (image for composition) to be composited with an image of a subject, which is extracted from a photographed image leaving out background objects, and to serve as the background of the subject on a printed copy.

Various kinds of image can be stored as templates, including a solid image (a monochromatic image of uniform density), a variety of designs and patterns, and scenery images such as famous and historical places, tourist sites, and theme parks.

The template may be stored as an image (picture) or, in the case of a solid image, as color values (image data of R, G and B), or as an image and color values.

The template storing unit 50 in the illustrated embodiment stores plural templates from which a suitable one is chosen prior to shooting.

The principal image storing unit 52 stores (image data of) the first principal image and (image data of) the second principal image which are picked up by the DSC 18. The background image storing unit 54 stores (image data of) a background image picked up by the DSC 18. The composite image storing unit 62 stores (image data of) a composite image that is created by the image compositing unit 60, which will be described later, by compositing the extracted subject with the image for composition as the background.

Known storage, alone or combined with the image memory 30, can be employed as the storing units 52, 54, and 62.

The subject extracting processing unit 56 calculates the difference between the background image and the first principal image and the difference between the first principal image and the second principal image to extract the subject out of the first principal image based on the two differences. A more detailed description will be given later.

The image compositing unit 60 reads a chosen template (image for composition) out of the template storing unit 50, deletes, from the first principal image, the background area left after the subject extracting unit 56 extracts the subject, and fits the read template behind the background-less subject image to create (image data of) a composite image which can be printed out or outputted in other forms.

Known methods can be employed for removal of the background area and for image composition.

The display 14 displays, under control of the display controller 34, a photographed image, a composite image, an image read out of a storage medium, an operation screen by GUI (Graphical User Interface), etc.

The order receiving machine 10 in the embodiment shown in FIG. 1 employs a touch panel as the display 14. In short, the display 14 doubles as a measure to operate the order receiving machine 10. Through GUI on the display 14, various instructions are inputted including a shooting instruction, an instruction to choose an image for composition (background of a printed photo), an image composition instruction, an instruction to print a photographed image (composite image), an instruction to retouch an image, and order information instructions such as a choice of image to be printed and the print size of the print.

The order receiving machine 10 (photographic apparatus) of the present invention is not limited to a mode in which every operation command is given through the touch panel, but may have additional operating tools such as a keyboard and a mouse. Alternatively, a keyboard and a mouse alone may be used to operate the order receiving machine 10 while the display 14 is restricted to the single task of displaying.

Figure 4:
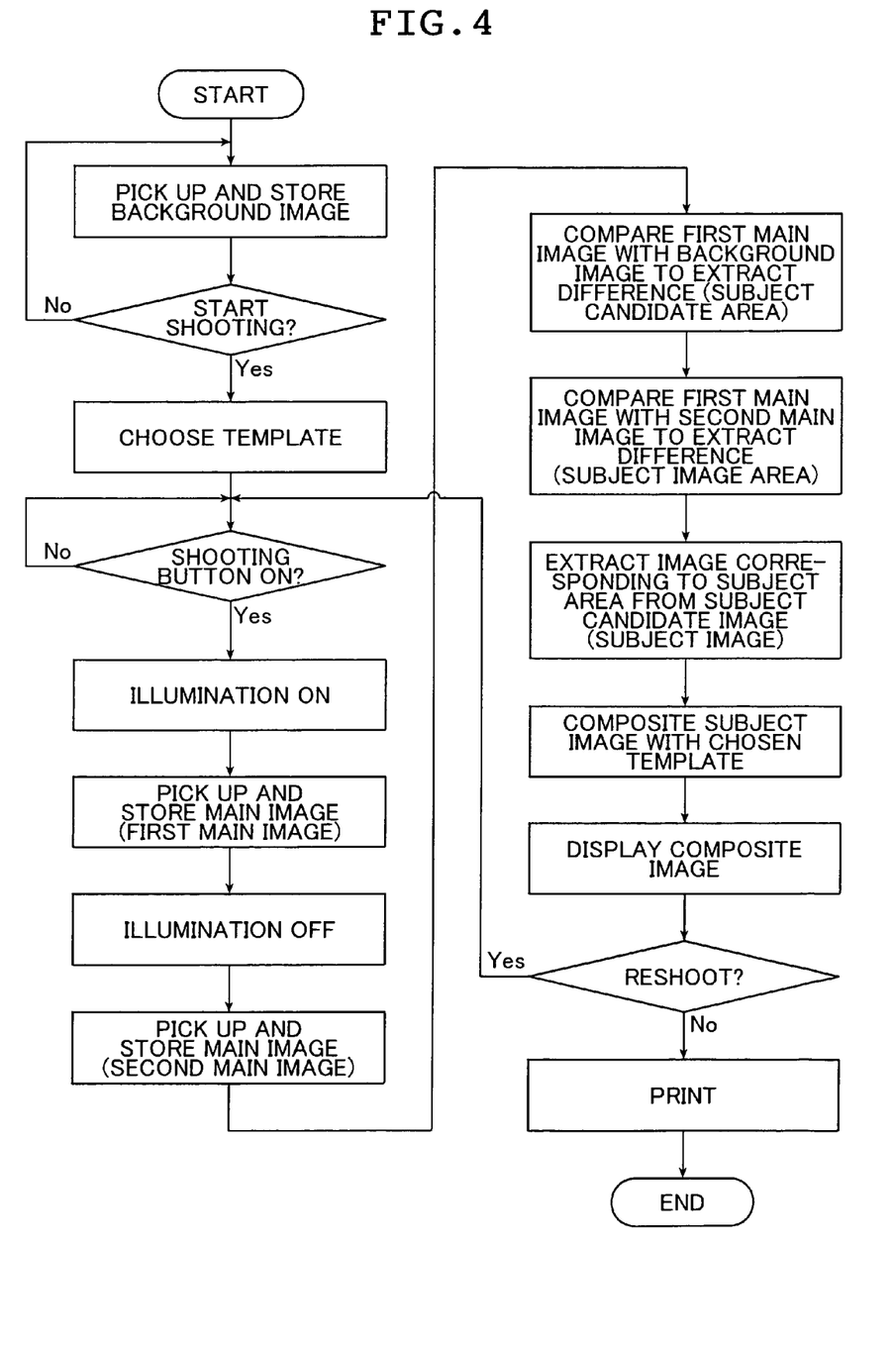
FIG. 4 is a flow chart illustrating how a photo is taken by the print order receiving machine shown in FIG. 1.

A more detailed description will be given below on a photographic method and photographic apparatus of the present invention by explaining how the order receiving machine 10 picks up an image with reference to a flow chart of FIG. 4.

While on standby (while not performing any processing), the order receiving machine 10 picks up a background image with the DSC 18. The photographed background image is stored in the background image storing unit 54.

The timing required to photograph a background image (in other words, when to output a shooting signal for picking up a background image from the shooting controlling unit 58 to the DSC 18) is not particularly limited. For instance, a background image may be picked up automatically at regular intervals, or automatically at a fixed time (e.g., at six o'clock, twelve o'clock and 18 o'clock), or upon reception of a shooting instruction through the display from a manager of the order receiving machine 10 or the like. These may be used in combination, or may be presented as options to choose from.

Under what condition a background image is to be picked up is not particularly limited. The order receiving machine 10 is in general installed inside a store, an outdoor space set specifically for the machine, or the like, and usually receives enough external illumination to pickup a proper background image without using the light source 20 to illuminate the background. However, in order to stably extract the subject with accuracy, it is preferable to photograph the background image under the same shooting conditions as the first principal image.

When a user, who is usually the subject, gives an instruction through the display 14 to start shooting, the order receiving machine 10 has the display 14 display a screen for selecting an image for composition (background of an image that is to be outputted), and prompts the user to choose one. Simultaneously, directions for informing the user where to stand and which way to face when shooting is executed may be displayed on the display 14.

When a template is chosen and a shooting instruction is given (a shooting button is turned on) by the user, the shooting controlling unit 58 turns the light source 20 on (illumination on) and then sends a shooting signal to the DSC 18. In response to the signal, the DSC 18 picks up the first principal image. The first principal image corresponds to the output, and therefore is picked up under shooting conditions under which the subject can be photographed properly. The light source 20 illuminates the subject positioned near the order receiving machine 10 so that the subject is properly photographed.

The first principal image (image data of the first principal image) is sent from the DSC 18 to the principal image storing unit 52 to be stored therein.

After the first principal image is picked up, the shooting controlling unit 58 turns off the light source 20 (illumination off) and then sends a shooting signal to the DSC 18. In response to the signal, the DSC 18 picks up the second principal image. The second principal image (image data of the second principal image) is also sent from the DSC 18 to the principal image storing unit 52 to be stored therein.

In order to set shooting conditions for the second principal image different from those of the first principal image, light emitted from the light source 20 for shooting may be reduced in amount instead of completely turning off the light source 20.

After the first principal image and the second principal image are photographed and stored in the principal image storing unit 52, the subject extracting processing unit 56 reads the first principal image and the second principal image out of the principal image storing unit 52, and reads the background image out of the background image storing unit 54.

Figure 5A:
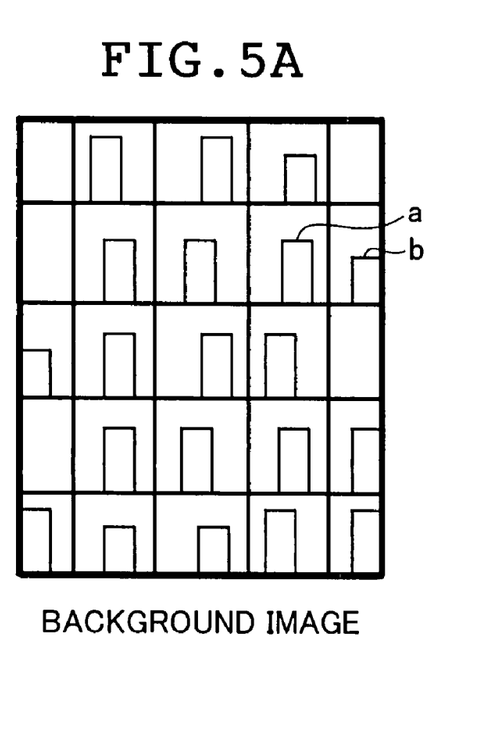
FIGS. 5A, 5B, and 5C are conceptual diagrams illustrating a photographic method of the present invention.
Figures 5B, 5C:
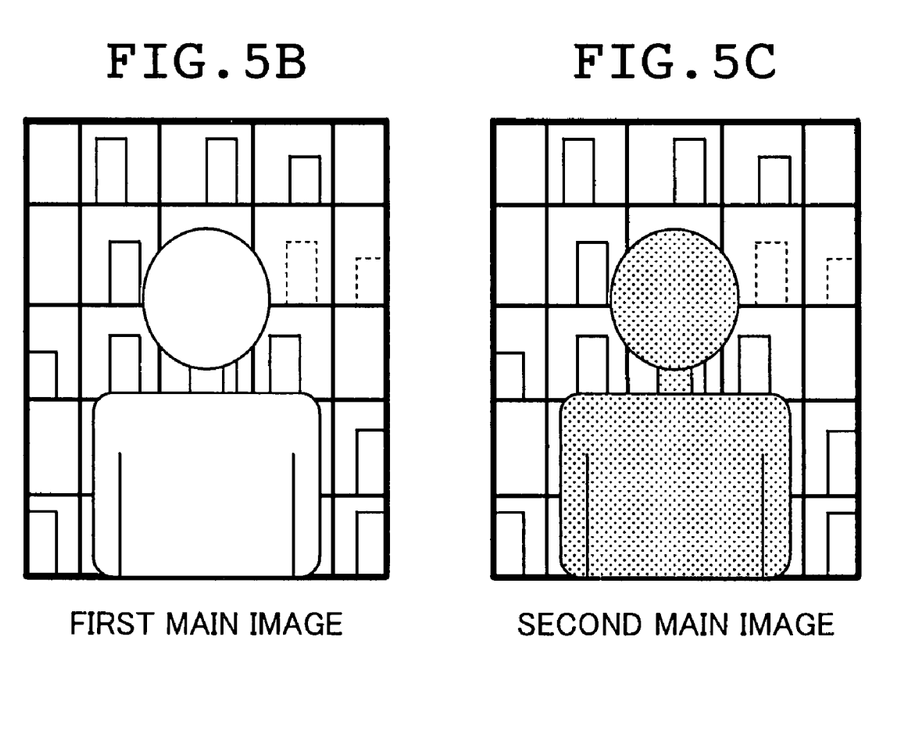

The following description is directed to a case in which the background image is the one shown in FIG. 5A, the first principal image is the one shown in FIG. 5B, and the second principal image is the one shown in FIG. 5C.

The subject extracting processing unit 56 first calculates the difference between the first principal image and the background image.

As described above, the order receiving machine 10 is usually installed in a place where external light is available in an amount enough to photograph the background, and the first principal image is picked up at illumination settings capable of properly photographing a subject positioned near the order receiving machine 10. In short, the first principal image holds a properly photographed background and subject whereas the background image holds a properly photographed background alone.

Accordingly, the difference between the two corresponds to an area that is changed from when the background image is picked up to when the first principal image is picked up, and includes the subject who was not present at the time of shooting the background image, and any change in the background. For instance, if an item a and an item b which were on the shelf at the time of shooting the background image have been removed from the background by the time the first principal image is picked up (the items are indicated by dotted lines in FIG. 5B), this area is extracted as the difference in addition to the subject. The difference therefore does not indicate the subject alone but is a subject candidate image, so to speak.

The subject extracting processing unit 56 next calculates the difference between the first principal image and the second principal image.

As described above, the first principal image holds a properly photographed subject and background. In the second principal image, which is picked up with illumination turned off, the background illuminated with enough external light as described above is properly photographed whereas the subject positioned near the order receiving machine 10 is not photographed properly because of insufficient amount of light for shooting. There is usually no change in the background between the first principal image and the second principal image since the first and second principal images are photographed practically in succession.

In short, the difference between the first principal image and the second principal image corresponds to a subject area separated by a blurred outline from the properly photographed background.

The subject extracting processing unit 56 next compares the difference between the first principal image and the background image (subject candidate image) against the difference between the first principal image and the second principal image (subject area) to extract a subject image from the first principal image.

As described above, the difference between the first principal image and the background image includes a properly photographed subject with a sharp outline and a change in the background, while the difference between the first principal image and the second principal image indicates a subject area with a blurred outline. Accordingly, an accurate subject area (subject image) in the first principal image can be extracted by detecting a rough subject area from the difference between the first principal image and the second principal image, and then using this information to remove an area where the background has been changed based on the difference between the first image and the background image.

After thus extracting the subject out of the first principal image, the subject extracting processing unit 56 supplies the subject area information to the image compositing unit 60.

The image compositing unit 60 reads the first principal image out of the principal image storing unit 52, and uses the supplied subject area information to remove from the first principal image background areas other than the subject area. The image compositing unit 60 then creates a composite image by placing the previously chosen template (image for composition) behind the subject in the first principal image. For instance, the background is removed from the first principal image leaving only the subject, and then a template is fit into the blank background area of the first principal image to create a composite image.

(Image data of) the composite image of the subject and the template is stored in the composite image storing unit 62.

The composite image is then displayed on the display 14 under control of the display controller 34 or the like. A screen for selecting whether the composite image is suitable or unsuitable (whether a photo is to be taken anew or the composite image is to be outputted as a printed copy) is also displayed on the display 14 to prompt the user to choose.

When the composite image is unsuitable, in other words, when "redo: Yes" is chosen to photograph the subject anew, the processing returns to the start of shooting (turn on the shooting button) and the subsequent steps are executed again in the same manner. Alternatively, the processing returns to the step of selecting a template and the subsequent steps are executed again in the same manner.

When the composite image is suitable, in other words, when "redo: No" is chosen, the composite image is supplied through the I/F 42 to the printer 38, which outputs the composite image as a printed copy (hard copy) Instead of being outputted as a printed copy, the composite image may be sent to the media R/W unit 12 to be recorded onto the loaded storage medium M, or may be outputted as a printed copy and recorded on the storage medium M.

Then the receipt printing printer 16 prints and outputs a receipt for the amount charged for a printed copy of the composite image.

As is clear from the above description, the present invention enables an ID photo or commemorative photo-taking apparatus to accurately extract the subject alone without needing drapery, a panel, a box (booth), or the like as the background regardless of changes in the background by photographing a background image, a first principal image, which is a picture of the subject taken at appropriate settings and corresponding to the output, and a second principal image, which is a picture of the subject taken under shooting conditions different from those of the first principal image. The present invention also enables the photographic apparatus to produce an ID photo or commemorative photo of high added value by compositing a prepared template (image chosen for composition) with the extracted subject.

In addition, since drapery or a panel as a backdrop and a box or the like inside which the subject enters are eliminated, the photographic apparatus is greatly reduced in size, which greatly enhances the degree of freedom in choosing where to install the apparatus even in a narrow store or the like. Furthermore, the present invention can readily be combined with such an existing apparatus as a print order receiving machine which is placed at a storefront to receive an order for producing a printed copy or the like from an image (data) recorded in a storage medium as in the illustrated embodiment.

In the above embodiment, shooting conditions different from those of the first principal image are set for the second principal image by changing illumination settings for shooting. However, the present invention is not limited thereto and there are various other ways to make shooting conditions of the first principal image different from those of the second principal image.

A preferred embodiment is to change the shooting conditions between the first principal image and the second principal image through change of the aperture of the DSC 18.

For instance, the first principal image is photographed at an aperture providing a depth of field that makes the camera focus on both the subject and the background whereas the second principal image is photographed at a depth of field that makes the camera focus on the subject alone by opening the aperture. The second principal image in this case is reverse to the one in the above embodiment, where the outline of the subject is dull because of the blurred background. In the manner described above, a subject candidate image is extracted based on the difference between the first principal image and the background image, a subject area is extracted based on the difference between the first principal image and the second principal image, and a changed background area is removed based on the two differences, to thereby extract the subject from the first principal image with precision.

Conditions other than the one in the preferred embodiment can be changed in the present invention to set different shooting conditions for the first principal image and the second principal image in extracting the subject from the first principal image.

A detailed description has been given on a photographic method and photographic apparatus of the present invention. However, the present invention is not limited to the above embodiment, and can receive various improvements and modifications without departing from the spirit of the present invention.

For instance, the present invention is not limited to the above embodiment where a photographic method and photographic apparatus of the present invention are applied to a print order receiving machine which receives an order for a printed copy of an image (image data) picked up by a digital camera or the like and stored in a storage medium such as SmartMedia™. The present invention may instead be applied to a photographic apparatus that only takes ID photos or commemorative photos and does not print.

The order receiving machine 10 may have a function of receiving an order for a printed copy or the like of not only image data stored in a storage medium but also image data obtained directly from cellular phones with a camera feature, digital cameras, or the like, and a function of processing the order (e.g., producing the printed copy) as well. Alternatively, the order receiving machine 10 may receive an order for a printed copy or the like of image data only from cellular phones and digital cameras. Also, the order receiving machine 10 may receive and process an order for a printed copy or the like of image data only from cellular phones and digital cameras.

What is claimed is:

1. A photographic method, comprising:
   taking, at the same shooting position, a background image without a subject, a first principal image for outputting, and a second principal image whose shooting conditions differ from those of said first principal image; and
   extracting said subject based on a first difference between said background image and said first principal image and a second difference between said first principal image and said second principal image.

2. The photographic method according to claim 1, wherein said extracted subject is composited with an image that is previously prepared for composition.

3. The photographic method according to claim 1, wherein said extracting step of said subject comprises:
   extracting a first subject candidate based on said first difference between said background image and said first principal image;
   extracting a second subject candidate based on said second difference between said first principal image and said second principal image; and
   setting, as said subject, an area common to said first subject candidate and said second subject candidate.

4. The photographic method according to claim 1, wherein said first principal image and said second principal image are photographed at different illumination settings.

5. The photographic method according to claim 1, wherein said first principal image and said second principal image are photographed at different apertures.

6. The photographic method according to claim 1, wherein a same subject appears in the first principal image and the second principal image.

7. The photographic method of claim 1, wherein the shooting conditions comprises taking the first principal image with a light source turned on and taking the second principal image with the light source turned off.

8. The photographic method of claims 1 wherein the shooting conditions comprises reducing an amount of light emitted from a light source when the second principal image is taken.

9. A photographic apparatus, comprising:
   a camera for photoelectrically picking up an image;
   changing means for changing shooting conditions;

shooting controlling means for causing said camera and said changing means to carry out shooting of a background image without a subject, a first principal image for outputting, and a second principal image whose shooting conditions differ from those of said first principal image; and image processing means for extracting said subject based on a first difference between said background image and said first principal image and a second difference between said first principal image and said second principal image.

10. The photographic apparatus according to claim 9, wherein said image processing means creates a composite image by compositing said extracted subject with an image that is previously prepared for composition.

11. The photographic apparatus according to claim 10, further comprising at least one of a printer which outputs, as a print, said composite image created by said image processing means, and recording means which records onto a recording medium said composite image created by said image processing means.

12. The photographic apparatus according to claim 9, further comprising a light source or sources for illuminating said subject, wherein said changing means sets said light source or sources to different illumination settings for shooting of said first principal image and shooting of said second principal image.

13. The photographic apparatus according to claim 12, wherein said light source or sources are an LED.

14. The photographic apparatus according to claim 12, wherein the light source is turned on when the first principal image is shot, and the light source is turned off when the second principal image is shot.

15. The photographic apparatus according to claim 9, wherein said camera has an aperture and said changing means sets different apertures for shooting of said first principal image and shooting of said second principal image.

16. The photographic apparatus according to claim 9, wherein a same subject appears in the first principal image and the second principal image.

17. The photographic apparatus of claim 9, an amount of light emitted from the light source is reduced when the second principal image is shot.

* * * * *